US006309531B1

(12) United States Patent
Murray (10) Patent No.: US 6,309,531 B1
(45) Date of Patent: Oct. 30, 2001

(54) PROCESS FOR EXTRACTING COPPER OR IRON

(75) Inventor: Michael C. Murray, Eustis, FL (US)

(73) Assignee: USF Filtration and Separations Group, Inc., Timonium, MD (US)

( * ) Notice: Subject to any disclaimer, the term of this patent is extended or adjusted under 35 U.S.C. 154(b) by 0 days.

(21) Appl. No.: 09/307,102

(22) Filed: May 7, 1999

Related U.S. Application Data
(60) Provisional application No. 60/084,691, filed on May 8, 1998.

(51) Int. Cl.⁷ .................................................. C25C 1/12
(52) U.S. Cl. ......................... 205/580; 205/584; 205/589
(58) Field of Search ................................ 205/580–583, 205/582, 584, 589

(56) References Cited

U.S. PATENT DOCUMENTS 4,256,553 * 3/1981 Baczek et al. ..................... 205/584
5,372,684 * 12/1994 Zoppi .................................. 205/582

\* cited by examiner

Primary Examiner—Kathryn Gorgos
Assistant Examiner—Wesley A. Nicolas
(74) Attorney, Agent, or Firm—Frijouf, Rust & Pyle, P.A.

(57) ABSTRACT

A chemical process is disclosed for extracting copper or iron (M). The copper or iron is exposed to a leaching solution comprised of a metal salt (m) such that the copper or iron (M) is solvated and the metal ion (m) is reduced according to the reaction $$2m^{+3}_{(aq)} + M_{(s)} \rightarrow 2m^{+2}_{(aq)} + M^{+2}_{(aq)}.$$

An electrolytic cell has an anion exchange membrane separating an anode chamber from a cathode chamber. The leaching solution with the solvated copper or iron is placed into the cathode chamber of the electrolytic cell. A second solution comprising a reduced state metal salt $m^{+2}$ of the salt in the leaching solution is then added to the electrolytic cell anode chamber. A voltage is applied to reduce and deposit the copper $Cu^{+2}$ or iron $Fe^{+2}$ at the cathode and to oxidize the metal $m^{+2}$ at the anode. The oxidized metal $m^{+2}$ in the anode chamber is then recycled as leaching solution for solvating copper or iron. The cathode chamber reduced-metal-containing solution is transferred to the anode chamber for oxidation of the reduced metal $m^{+2}$.

26 Claims, 11 Drawing Sheets

PROCESS FOR EXTRACTING COPPER OR IRON

CROSS-REFERENCE TO RELATED APPLICATIONS

This application claims benefit of U.S. Patent Provisional application Ser. No. 60/084,691 filed May 8, 1998. All subject matter set forth in provisional application Ser. No. 60/084,691 is hereby incorporated by reference into the present application as if fully set forth herein.

BACKGROUND OF THE INVENTION

1. Field of the Invention

This invention relates to a method for extracting a metallic composition. More particularly, this invention relates to a method for extracting a metal selected from a group consisting of copper and iron. In one embodiment, the method uses chemical reaction to remove copper or iron to be regenerated and recycled.

2. Background of the Invention

The use of metallic copper and iron is wide spread in many industries. The uses of metallic copper extend from circuit boards to use as a stop off material in the metal finishing industry. The uses of iron are too numerous to mention.

Many of the industrial uses for copper involve copper leaching or removal at some stage of industrial processing. A number of problems are presently associated with removing metallic copper or iron including the problem of waste products associated with the removal of the metallic composition. These problems are even more pronounced when removing copper or iron from a non-same metal substrate thereby producing multiple waste products.

Several methods are available for the dissolution of copper or iron (M) from a substrate. One such method involves the use of hydrogen peroxide and an acid. The reaction generally proceeds via the reaction:

$$H_2O_2 + HA + M_{(s)} \rightarrow 2H_2O + MA$$

Continued use of this reaction produces a solution that is saturated with MA salt. The saturated solution can then be treated by crystallizing out the MA salt in a hydrated form. CuA crystallization requires a large capital investment in a crystallizer, a first drawback to this method of copper or iron removal. Further, the large volume of water generated via the oxidation of copper or iron in the presence of $H_2O_2$ and HA poses a problem. Copper or iron act as a catalyst in the decomposition of $H_2O_2$, consuming up to 10 times the anticipated stoichiometric amount of hydrogen peroxide. Thus, even though approximately five molecules of water are removed with every molecule of MA salt precipitated in the crystallizer, water is still formed at a much greater rate than it is removed. Further still, the hydrogen peroxide/acid method of removing copper from a substrate is unappealing in that the consumed hydrogen peroxide and acid reactants must always be replaced at great expense, and the crystallized copper or iron salt is costly for disposal.

Another common method for removing copper or iron from a substrate utilizes ferric chloride. Ferric is reduced to ferrous, while the metallic copper or iron is oxidized to cupric or ferrous, respectively. This method also has its disadvantages. For copper, the ferrous/ferric/cupric end product mixture is usually acidic, and is considered hazardous waste and is very costly for disposal. The waste can be chemically treated by processing of the waste via cupric removal and acid neutralization. Federal and state regulations permitting, the treated and filtered neutralized iron solution can be discharged in plant effluent. The use of ferric chloride in dissolving copper or iron from a substrate is even more costly than the acid-peroxide method due to the extensive chemical processing requirements, and the complete consumption of the ferric chloride oxidizing agent.

Still another chemical process for dissolving copper or iron involves making the copper-containing substrate an anode in a plating cell. The main problem with this method is that the cell voltage must be kept below the oxidation potential of the underlying substrate to prevent substrate dissolution. Such low voltages require a very large substrate surface area for reasonable copper or iron oxidation reaction rates, frequently making the use of this method impractical.

Others have tried to overcome the above mentioned shortcomings (voluminous end products, hazardous end products, complete consumption of chemical reactants, large surface areas associated with electrolytic cells . . . ), but have met only limited success.

U.S. Pat. No. 3,669,651 to Spedden et al. discloses the ferric sulfate-sulfuric acid leaching of naturally occurring, copper-bearing materials, such as copper minerals in mine waste dumps, and recovery of the dissolved copper by precipitation on metallic iron. The leaching is carried out on a cyclic basis, with reduction of ferric ions prior to the copper precipitation step. The pregnant leach solution is treated with a controlled quantity of a water soluble reductant, such as sulfur dioxide or ammonium bisulfite, for a sufficient period of time in the presence of activated carbon to minimize the ferric ion content thereof while substantially completely consuming the active ions of the reductant so wasteful consumption of the iron precipitant will be prevented while insuring most effective precipitation of copper, and so as also to provide nourishment, when ammonium bisulfite is employed as a reductant, or iron-oxidizing bacteria normally present in the leach solution.

U.S. Pat. No. 5,372,684 teaches the leaching of copper scrap, reduced to particulate form having particle sizes not larger than 50 mm, in a suitable apparatus with a solution of ferric fluoroborate in fluoroboric acid. During leaching, copper is dissolved, with ferric fluoroborate simultaneously being reduced to ferrous fluoroborate according to the following reaction:

$$2Fe(BF_4)_3 + Cu \rightarrow Cu(BF_4)_2 + 2Fe(BF_4)_2 \quad (1)$$

The resulting solution is fed to the cathodic compartment of a diaphragm cell, in which copper is deposited, in compact and highly pure form, on a stainless steel cathode, from which it is periodically recovered. Neither of these inventions overcome all of the problems presently encountered when removing copper from a substrate.

U.S. Pat. No. 3,669,651, applying to a mine waste dump setting, requires either bacterial oxidation of $Fe^{+2}$ ions to $Fe^{+3}$ ions or the costly consumption of an additional oxidizing agent to regenerate ferric. Further, the ammonium bisulfite must regularly be replenished at an expense.

U.S. Pat. No. 5,372,684 requires the handling of the corrosive and costly flouroboric acid. Further, the reaction conditions require a low pH of less than 1 or the reaction conditions to be practicable in an industrial setting, or else the copper scrap mu t be manually ground down to a particle size of less than 50 mm.

It is therefore an object of the present invention to provide a chemical process for selectively removing a metallic substance, more particularly copper or iron wherein the process is inexpensive and utilizes relatively, safe chemical components.

It is further an object of the present invention to provide a chemical process for selectively removing copper or iron wherein the copper or iron is ultimately converted to a non-hazardous form that can be easily handled and inexpensively discarded.

It is further an object of the present invention to provide a chemical process for selectively removing copper or iron through a chemical reaction wherein the copper or iron can selectively be plated out in an electrolytic cell so that the copper or iron waste product can be easily handled and inexpensively disposed of.

It is further an object of the present invention to provide a chemical process for selectively removing copper or iron wherein an oxidizing agents is utilized to remove the copper or iron and wherein the reduced oxidizing agent is recyclable, thereby avoiding the need to constantly replenish costly oxidizing agents.

It is further an object of the present invention to provide a chemical process for selectively removing copper or iron wherein an oxidizing agent is utilize to remove the copper or iron, wherein the reduced oxidizing agent is recyclable and wherein electricity is used to both regenerate the expended oxidizing agent and to treat the chemically removed copper or iron waste in an inexpensive and cost effective manner.

It is further an object of the present invention to provide an improved chemical process for leaching copper or iron which may be operated continuously.

It is further an object of the present invention to provide an improved chemical process for leaching copper or iron from a substrate which may be operated continuously and wherein the leaching reaction may be controlled by monitoring the chemical components of an acid bath and/or the anode and cathode chambers of an electrolytic cell.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention and the detailed description setting forth the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a method for extracting copper or iron. The first step in the method comprises exposing the copper or iron (M) to a leaching solution comprising a metal salt (m). The copper or iron (M) is solvated and the metal ion is reduced in the leaching solution according to the following reaction.

$$2m^{+3}{}_{(aq)} + M_{(s)} \rightarrow 2m^{+2}{}_{(aq)} + M^{+2}{}_{(aq)}$$

In one example of the invention, the copper $Cu_{(s)}$ is solvated and the metal ion is reduced in the leaching solution according to the following reaction.

$$2m^{+3}{}_{(aq)} + Cu_{(s)} \rightarrow 2M^{+2}{}_{(aq)} + Cu^{+2}{}_{(aq)}$$

In another example of the invention, the iron $Fe_{(s)}$ is solvated and the metal ion is reduced in the leaching solution according to the following reaction.

$$2m^{+3}{}_{(aq)} + Fe_{(s)} \rightarrow 2m^{+2}{}_{(aq)} + Fe^{+2}{}_{(aq)}$$

An electrolytic cell is provided, wherein the electrolytic cell contains an anion exchange membrane separating the anode and cathode, thereby creating an anode chamber and a cathode chamber. The cupric $Cu^{+2}$ or ferrous $Fe^{+2}$ containing leaching solution is transferred into the chamber of the electrolytic cell. A second solution is then added to the anode chamber of the electrolytic cell. This second solution comprises a reduced state metal $m^{+2}$ of the salt in the leaching solution. Voltage is next applied to the cell. On application of this voltage, the copper $Cu^{+2}$ or iron $Fe^{+2}$ is reduced and deposited at the cathode and the reduced metal $m^{+2}$ is oxidized at the anode. The oxidized metal $m^{+3}$ in the anode chamber is the recycled as a leaching solution for solvating additional copper or iron. The cathode chamber reduced-metal-containing solution is transferred to the anode chamber for oxidation of the metal salt.

In another example of the invention, the invention relates to a method for extracting copper or iron from a substrate. The first step in the method comprises exposing a copper or iron containing substrate to a leaching solution comprising a metal salt. The substrate may be insolvable in the leaching solution. The copper or iron (M) is solvated and the metal ion (m) is reduced in the leaching solution according to the reaction.

$$2m^{+3}{}_{(aq)} + M_{(s)} \rightarrow 2m^{+2}{}_{(aq)} + M^{+2}{}_{(aq)}.$$

An electrolytic cell is provided, wherein the electrolytic cell contains an anion exchange membrane separating the anode and cathode, thereby creating an anode chamber and a cathode chamber. The cupric $Cu^{+2}$ or ferrous $Fe^{+2}$ containing leaching solution is transferred into the chamber of the electrolytic cell. A second solution is then added to the anode chamber of the electrolytic cell. This second solution comprises a reduced state metal $m^{+2}$ of the salt in the leaching solution. A voltage is applied to the cell to reduce and deposit the cupric $Cu^{+2}$ or ferrous $Fe^{+2}$ at the cathode and to oxidize the metal $m^{+2}$ at the anode The oxidized metal $m^{+3}$ in the anode chamber is then recycled as a leaching solution for solvating additional copper. The cathode chamber reduced-metal-containing solution is transferred to the anode chamber for oxidation of the metal salt.

In a more specific embodiment, the salts utilized in the leaching and second solution are iron salts, and may be iron sulfates, wherein the salt in the leaching solution is ferric sulfate, and wherein the salt in the second solution is ferrous sulfate. The substrate is comprised of stainless steel, although in alternative embodiments, the substrate ma be comprised of polyethylene, platinum, or any number of iron-based super alloys including HAYNES 556 or HR 120 which can be obtained from Haynes International, Inc.

Preferably, the step of solvating the copper or iron is performed at a pH of less than 2.8 and in another embodiment the temperature is maintained anywhere in the range of 76 to 200 F. Prior to transferring the leaching solution to the cathode chamber of the electrolytic cell, the solution may be filtered to remove any impurities. Additional oxidized state metal salt may be added to the solution of oxidized metal $m^{+3}$ in the anode chamber prior to its recycling in a particular embodiment.

In a particular embodiment, the concentration of ferric sulfate in the leaching solution is anywhere in the range of 10 to 50 g/l. In yet another embodiment, the cupric concentration in the cathode chamber is maintained above 10 g/l. The ratio of $Fe^{+3}$ to $Fe^{+2}$ in the leach solution is maintained in the range of 1:0 to 0:1 by continuously adding expended leaching solution to the cathode chamber of the electrolytic cell and continuously adding recharged ferric solution from the anode chamber to the leaching solution to remove additional copper from the substrate.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated that the conception and the specific embodiments disclosed may be readily utilized as a basis for modifying or designing other structures for carrying out the same purposes of the present invention. It also should be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

The present invention provides a chemical process for removing copper or iron via chemical reaction wherein the reactants used to leach the copper or iron are relatively, safe to store and handle and are relatively inexpensive. All of the chemicals used in the leaching reaction are regenerable and recyclable thereby conserving on chemical costs typically associated with copper or iron removal. The regeneration techniques do not require the consumption of additional chemical reactants, but merely the use of an electrical voltage.

The process may be used with any number of types of substrates, including polyethylene substrates, thereby making the process useful in the circuit board manufacturing industry. The process is also useful with metallic substrates. The process may be used for removing copper or iron from stainless steel fibers.

U.S. Pat. No. 5,890,272 teaches a process for making fine metallic fibers. One embodiment of the invention defines a process comprising coating a plurality of stainless steel wires with a copper coating material and inserting the plurality of stainless steel wires within a carbon steel tube for providing a cladding. The cladding is drawn for reducing the outer diameter thereof. The carbon steel tube is mechanically removed to provide a remainder comprising the copper coating material with the plurality of stainless steel contained therein. The copper coating material is removed to provide the desired fine stainless steel fiber end product. The process of the present invention can be utilized to remove the copper from the stainless steel fibers.

The present invention utilizes an electrolytic cell with an anion-exchange membrane separating the cathode and anode in order to regenerate chemicals consumed in leaching copper or iron from a substrate. The electrolytic cell also serves to electroplate the leached copper or iron in a pure and disposable form.

A. Copper or Iron Leaching

Figure 1A:
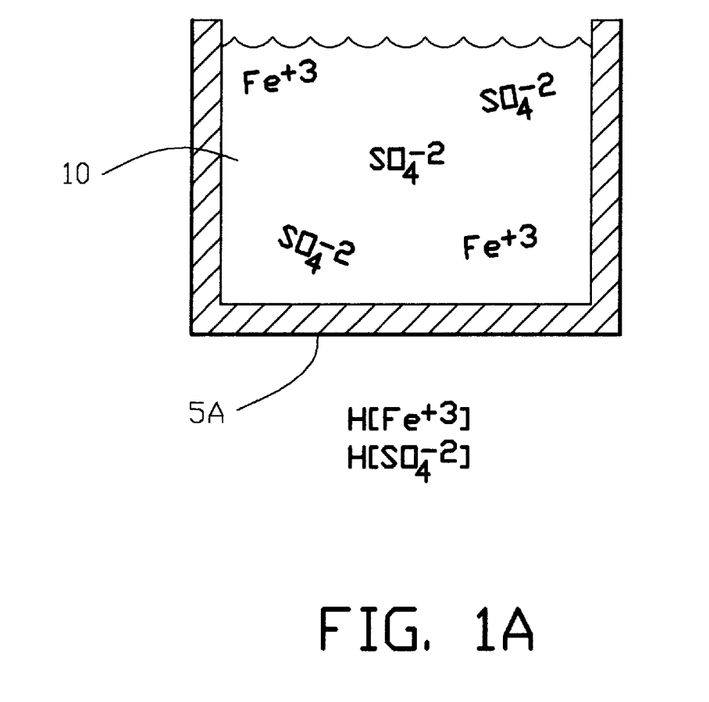
FIG. 1A illustrates a vessel containing a leaching solution for the leaching of copper or iron.

FIG. 1A illustrates a vessel 5A for containing a leaching solution 10 for reacting with copper or iron. The leaching solution 10 contains ferric ions represented by the bold $Fe^{+3}$ symbols and sulfate ions are represented by the bold $SO_4^{-2}$ symbols. The solution contains a high concentration of ferric in the leaching solution 10, as represented by the symbol H[$Fe^{+3}$] (H=High; [ ]=Concentration), and a high concentration of sulfate H[$SO_4^{-2}$] as illustrated below the vessel 5A.

Figure 1B:
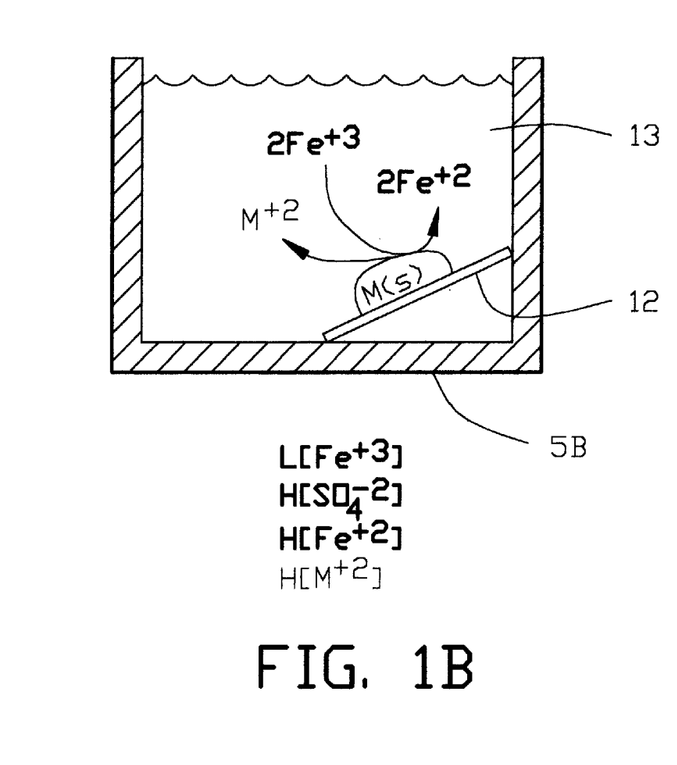
FIG. 1B illustrates the vessel of FIG. 1A with copper or iron on a substrate immersed within the solution for leaching copper or iron from the substrate by the oxidation of copper to cupric or iron to ferrous and the simultaneous reduction of an oxidizing agent.

FIG. 1B illustrates the vessel 5A of FIG. 1A with copper or iron (M) shown disposed on a substrate 12 immersed within the leaching solution 10 of FIG. 1A. The copper or iron (M) containing substrate 12 is placed in the leaching solution 10 of ferric sulfate, or $Fe_2(SO_4)_3$ in vessel 5B for leaching copper or iron (M) from the substrate by the oxidation of the copper to cupric or iron to ferrous and the simultaneous reduction of an oxidizing agent.

Upon addition of the copper or iron (M) containing substrate 12 to the leach solution, the copper $Cu_{(s)}$ is oxidized to cupric $Cu^{+2}$ or $Fe_{(s)}$ is oxidized to ferrous $Fe^{+2}$ and the ferric $Fe^{+3}$ is reduced to ferrous $Fe^{+2}$. For every $Cu^{+2}$ or $Fe^{+2}$ ion that is generated, two $Fe^{+2}$ are also generated, and two $Fe^{+3}$ consumed. After oxidation of the copper $Cu_{(s)}$ to $Cu^{+2}$ or oxidation of $Fe_{(s)}$ to ferrous $Fe^{+2}$, the solution contains a low ferric concentration L[$Fe^{+3}$], a high ferrous concentration H[$Fe^{+2}$], a high sulfate concentration H[$SO_4^{-2}$], and a high cupric or ferrous concentration H[$M^{+2}$] as illustrated below the vessel 5B.

B. Re-Plating the Leached Copper or Ferric in an Electrolytic Cell

Figure 2A:
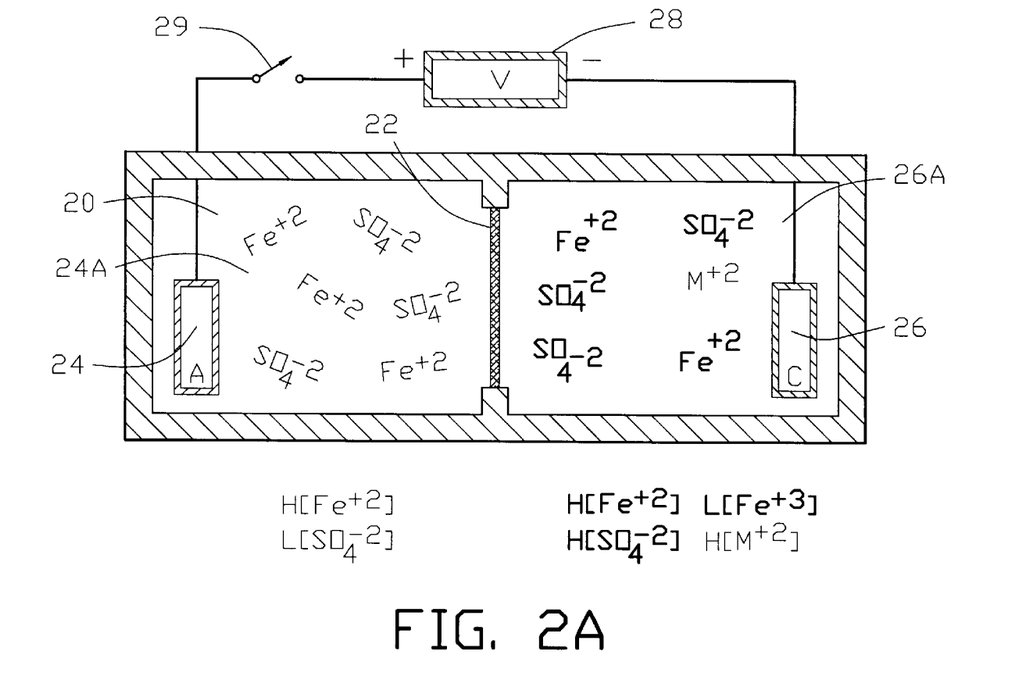
FIG. 2A illustrates an electrolytic cell with a cation-impermeable membrane separating the anode and cathode.

FIG. 2A illustrates an electrolytic cell 20 with a cation-impermeable membrane 22 separating an anode 24 and a cathode 26. The anion exchange membrane 22 separates the anode 24 from the cathode 26 to create an anode chamber 24A and a cathode chamber 26A. A voltage source 28 and a switch 29 are connected between the anode 24 and the cathode 26.

The copper or iron containing leaching solution from the vessel 5B of FIG. 1B is transferred to cathode chamber 26A of the electrolytic cell 20 shown in FIG. 2A. The symbols in bold in FIGS. 2–5 are intended to simplify the flow of the original components of the leaching solution 10 of FIG. 1A prior to exposure to the copper or iron containing substrate 12.

The anode chamber 24A contains a solution of ferrous sulfate $FeSO_4$, wherein the ferrous ions are represented by $Fe^{+2}$ and the sulfate by $SO_4^{-2}$. The solution in the anode chamber 24A contains a high concentration of ferrous H[$Fe^{+2}$] and a low concentration of sulfate L[$SO_4^{-2}$]. The cupric or ferrous containing leaching solution 13 from the vessel 5B of FIG. 1B is transferred to the cathode chamber 26A of the electrolytic cell 20 of FIG. 2A.

Figure 2B:
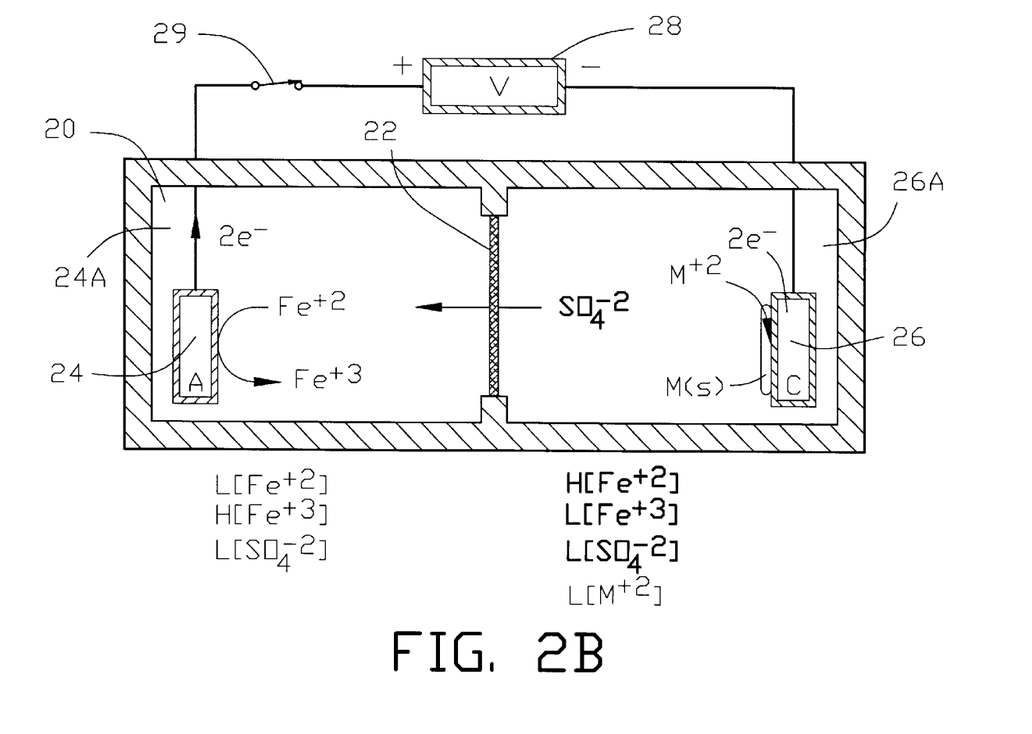
FIG. 2B illustrates the electrolytic cell of FIG. 2A connected to a voltage source for plating out of the dissolved copper or iron of FIG. 1 with the copper or iron plating occurring at the cathode.

FIG. 2B illustrates the electrolytic cell 20 of FIG. 2A upon the closing of the switch 29 to provide a current from the voltage source 28 between the anode 24 and the cathode 26. The cupric $Cu^{+2}$ or ferrous $Fe^{+2}$ in the cathode chamber 26A is reduced and plated out as $Cu_{(s)}$ or $Fe_{(s)}$ at the cathode 26, and ferrous $Fe^{+2}$ is oxidized to ferric $Fe^{+3}$ at the anode 24. For every cupric $Cu^{+2}$ or ferrous $Fe^{+2}$ that is reduced in the cathode chamber 26A, two ferrous $Fe^{+2}$ are oxidized. In addition, for every two ferrous $Fe^{+2}$ that are oxidized, one sulfate $SO_4^{-2}$ molecule migrates through the anion exchange membrane 22 from the cathode chamber 26A to the anode chamber 24A. After the copper or iron has been plated out at the cathode 26, and the ferrous oxidized at the anode 24, the relative ion concentrations in the cathode and anode chambers 24A and 26A are as follows:

| Anode Chamber | Cathode Chamber |
|---|---|
| L[$Fe^{+2}$] | H[$Fe^{+2}$] |
| H[$Fe^{+3}$] | L[$Fe^{+3}$] |
| H[$SO_4^{-2}$] | L[$SO_4^{-2}$] |
| | L[$M^{+2}$] |

The bold symbols are intended to demonstrate the flow of the initial reactants in the leaching solution prior to addition of the copper or iron containing substrate 12.

C. Recycling the Expended Leaching Solution

Figure 3A:
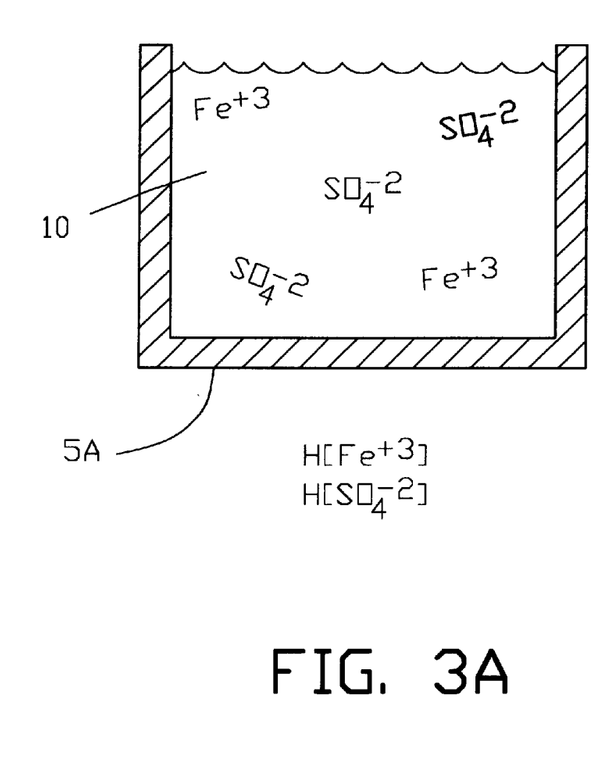
FIG. 3A illustrates the vessel of FIG. 1A being filled with the solution from the anode chamber of FIG. 2B for use as a leaching solution.

FIG. 3A illustrates the vessel 5A of FIG. 1A being filled with the solution from the anode chamber of FIG. 2B for use as a leaching solution. The ferrous solution oxidized at the anode 24 in the anode chamber 24A of the electrolytic cell 20 of FIG. 2B can be utilized as a leaching solution 10 to remove copper or iron from the substrate 12.

Figure 3B:
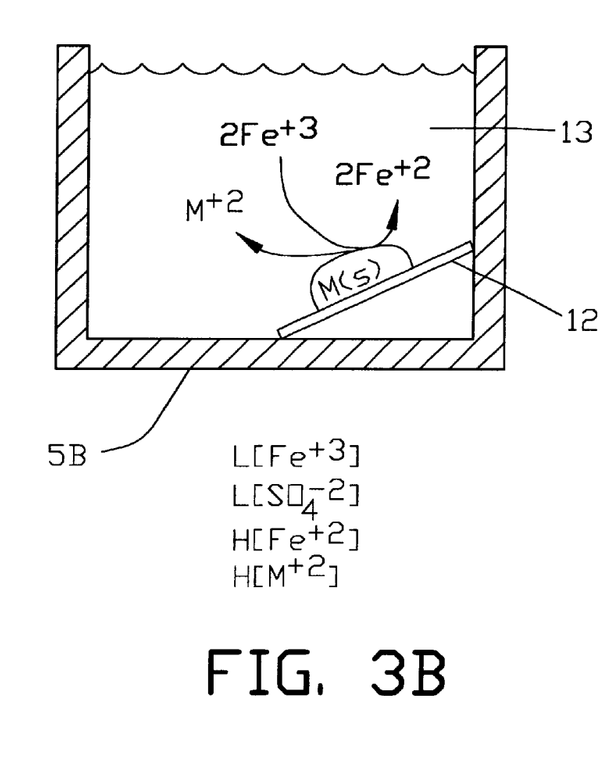
FIG. 3B illustrates the vessel of FIG. 1B with copper or iron on the substrate immersed within the solution from the anode chamber of FIG. 2B for leaching additional copper or iron from the substrate by the oxidation of copper to cupric or iron to ferrous and the simultaneous reduction of an oxidizing agent.

FIG. 3B illustrates the vessel 5B of FIG. 1B with copper or iron on the substrate immersed within the solution from the anode chamber of FIG. 2B for leaching additional copper or iron from the substrate 12 by the oxidation of copper to cupric or iron to ferrous and the simultaneous reduction of an oxidizing agent. The reaction which takes place in FIG. 3B is identical to the reaction as described in FIG. 1B.

Figure 4A:
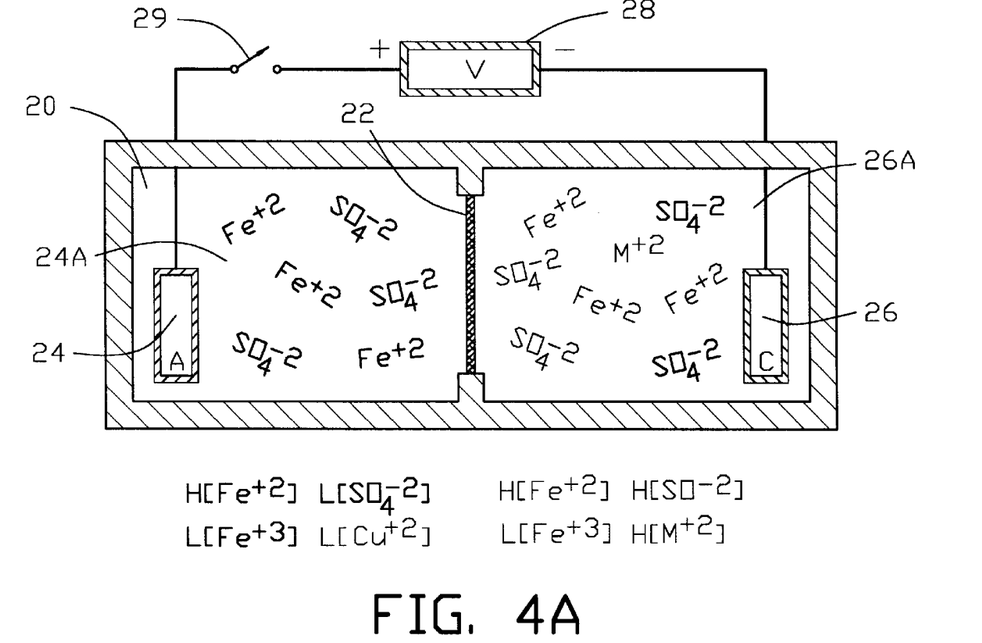
FIG. 4A illustrates an electrolytic cell with a cation-impermeable membrane separating the anode and cathode with the anodic chamber of FIG. 4A receiving the solution from the cathodic chamber of FIG. 2B.

FIG. 4A illustrates an electrolytic cell 20 with the cation-impermeable membrane 22 separating the anode chamber 24A and the cathode chamber 26A. The H[$M^{+2}$] leaching solution from FIG. 3B is transferred back to the cathode chamber 26A of the electrolytic cell 20 as shown in FIG. 4A, as was the original expended leaching solution 10 as described with reference to FIG. 2A. The anode chamber 24A comprises the expended leaching solution, minus the high cupric or ferrous $M^{+2}$ concentration, described with reference to FIG. 2A.

The anode and cathode chambers 24A and 26A comprise the following chemical levels:

| Anode Chamber | Cathode Chamber |
|---|---|
| H[$Fe^{+2}$] | H[$Fe^{+2}$] |
| L[$Fe^{+3}$] | L[$Fe^{+3}$] |
| L[$SO_4^{-2}$] | H[$SO_4^{-2}$] |
| L[$M^{+2}$] | H[$M^{+2}$] |

Similarly, the bold symbols are intended to demonstrate the flow of the initial reactants in the leaching solution prior to addition of the copper or iron containing substrate.

Figure 4B:
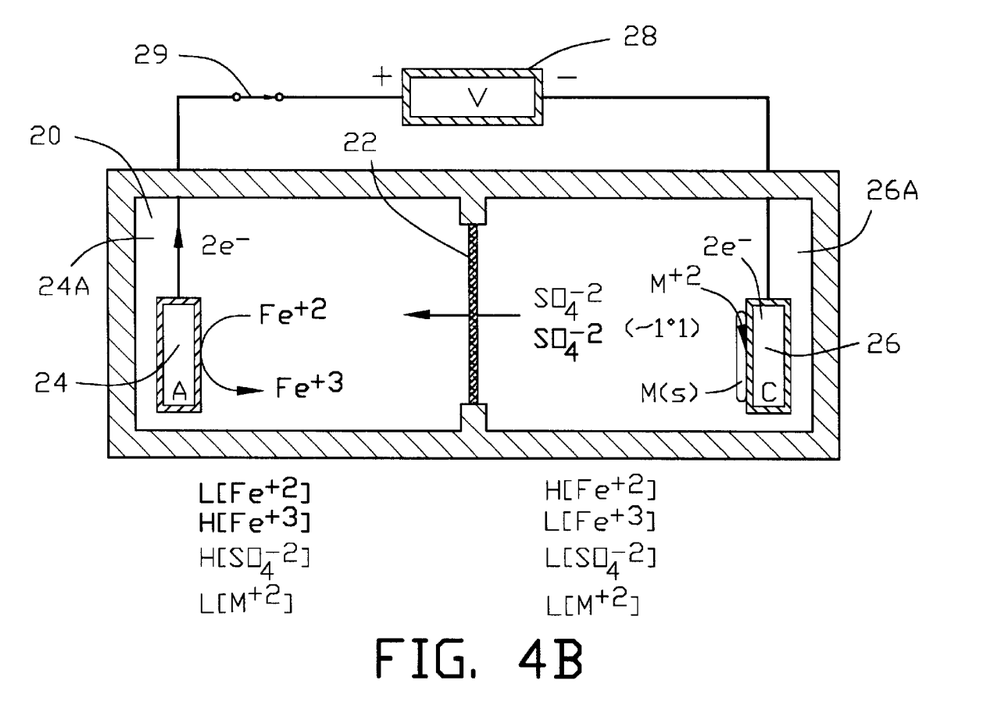
FIG. 4B illustrates the electrolytic cell of FIG. 4A connected to a voltage source for for regenerating the oxidizing agent solution received from the cathodic chamber of FIG. 2B.
Figure 5A:
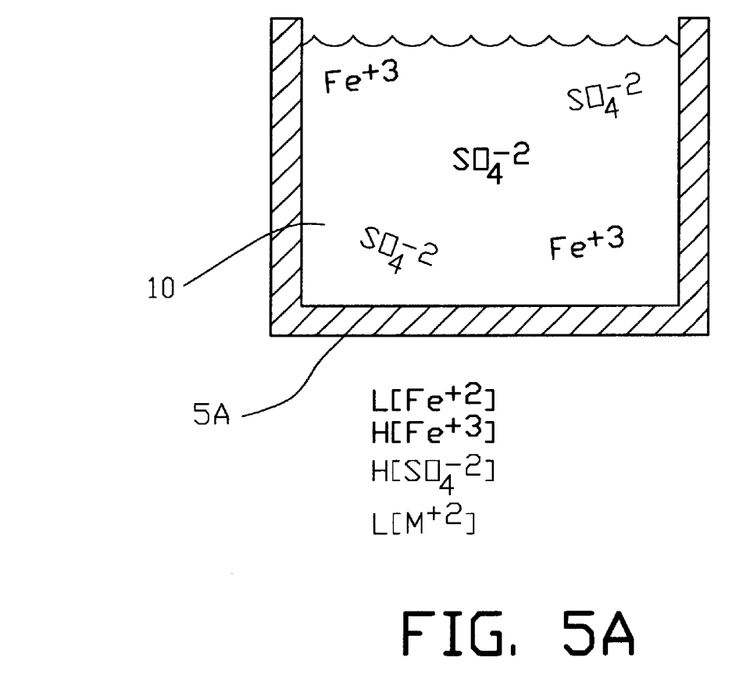
FIG. 5A illustrates the vessel of FIG. 1A being filled with the recycled oxidizing agent solution from FIG. 4B.
Figure 5B:
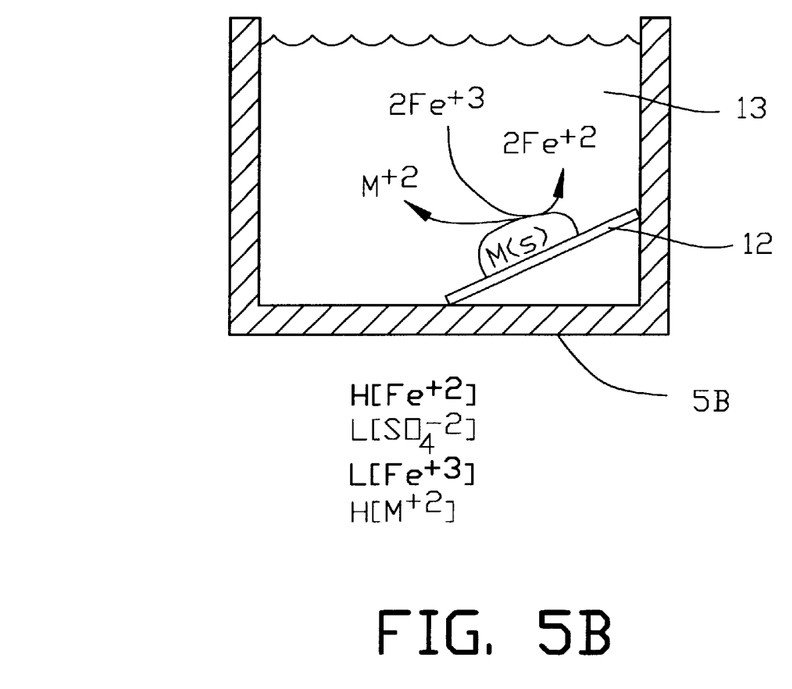
FIG. 5B illustrates the vessel of FIG. 5A with copper or iron on the substrate immersed within the recycled oxidizing agent solution from FIG. 4B for leaching additional copper or iron from the substrate by the oxidation of copper to cupric or iron to ferrous and the simultaneous reduction of an oxidizing agent.

FIG. 4B illustrates the electrolytic cell 20 of FIG. 4A connected to the voltage source 28 for regenerating the oxidizing agent solution received from the cathode chamber 26A of FIG. 2B. Upon application of current, the cupric or ferrous $M^{+2}$ in the cathode chamber 26A is plated out as described in FIG. 2B. For every reduced $M^{+2}$, one sulfate $SO_4^{-2}$ migrates from the cathode chamber 26A to the anode chamber 24A. Further, the ferric of the original leaching solution 10 of FIG. 1A is regenerated via the oxidation of $Fe^{+2}$ to $Fe^{+3}$ in the anode chamber 24A. This regenerated ferric can be recycled and used as a leaching solution 10 for removal of additional copper or iron from substrate as shown in FIGS. 5A and 5B. The H[$Fe^{+2}$] cathode chamber 26A solution of FIG. 4B would ultimately be moved to the anode chamber 24A for oxidation of the ferrous $Fe^{+2}$. It should be evident to those skilled in the art that the above system allows for the regeneration of ferric ions used to leach metal (M) from the substrate.

Figure 6:
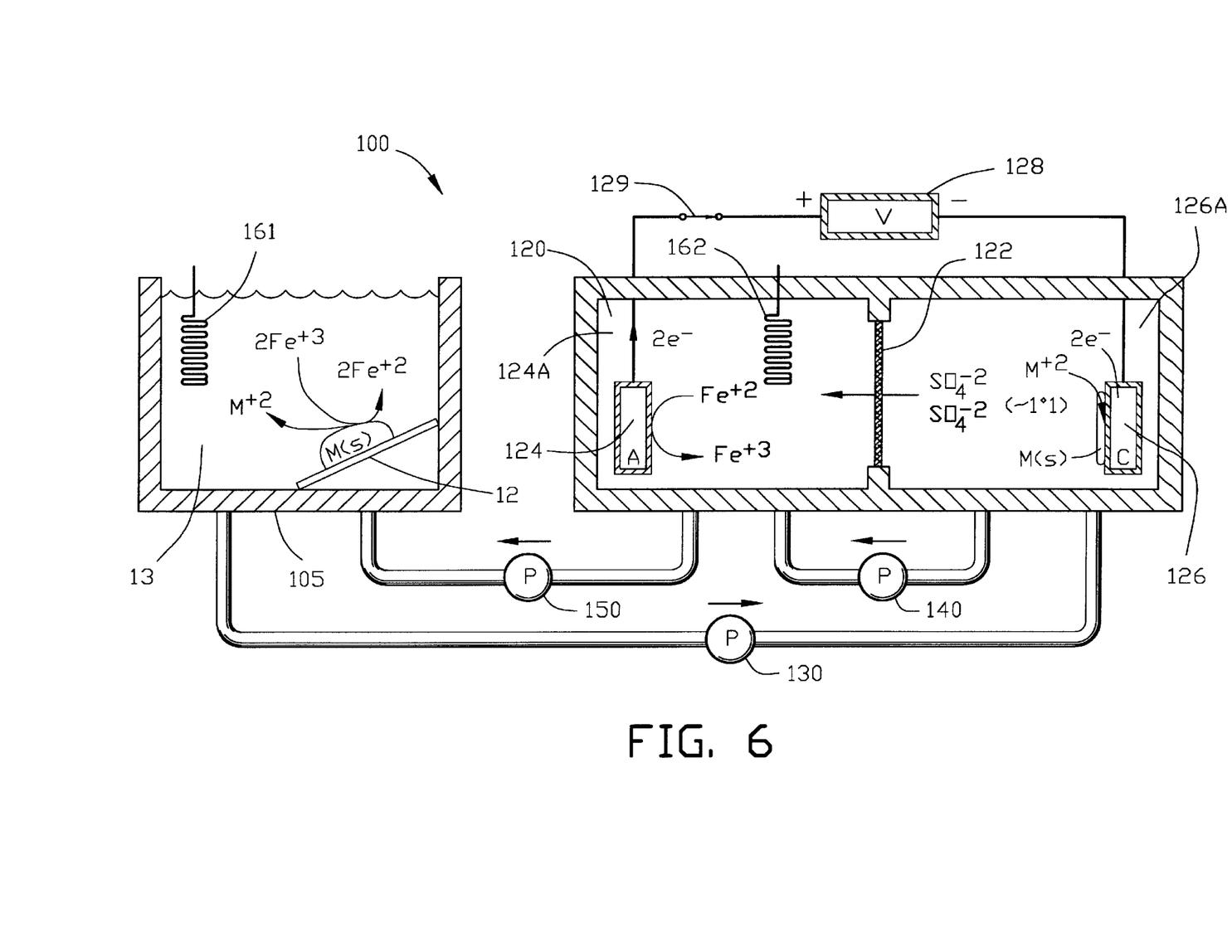
FIG. 6 illustrates a first embodiment of a continuous system operating between a leaching tank and an electrolytic cell.

FIG. 6 illustrates a first embodiment of a continuous system 100 operating between a leaching vessel 105 and an electrolytic cell 120. The leaching vessel 105 is substantially similar to the vessels 5A and 5B of FIGS. 1, 3 and 5. The electrolytic cell 120 is substantially similar to the electrolytic cell 20 of FIGS. 2 and 4. The electrolytic cell 120 includes an anion exchange membrane 122 that separates an anode 124 from an cathode 26 thereby defining an anode chamber 124A and a cathode chamber 126A.

When the leaching solution 10 in the leaching vessel 105 has been expended, a pump 130 takes the cupric or ferrous containing expended leaching solution 10 from the leaching vessel 105 to the cathode chamber 126A of the electrolytic cell 120. The electrolytic cell 120 is activated to plate out cupric or ferrous from the solution in the cathode chamber 126A.

After the cupric or ferrous has been plated out from the solution in the cathode chamber 126A, a pump 140 pumps the solution from the cathode chamber 126A into the anode chamber 124A. Simultaneously therewith, the solution in the anode chamber 124A is pumped by a pump 150 to the leaching vessel 105. Additionally, the pump 130 carries additional cupric or ferrous containing expended leaching solution 13 to the cathode chamber 126A, thereby completing the pumping cycle.

Preferably, the three pumps 130, 140, 150 are activated and deactivated simultaneously by a control (not shown). The control (not shown) may activate the pumps 130, 140, 150 in response to the level of cupric or ferrous in the leaching vessel 105, or in response to the concentration of $Fe^{+3}$ in the leaching vessel 105, or in response to the concentration of $Fe^{+3}$ in the anode chamber 124A, or in response to the ratio of $Fe^{+2}:Fe^{+3}$ in the anode chamber 124A, or in response to any chemical parameter. In the alternative, the pumps 130 140, 150 may be independently controlled by independent variables, such as by the level of cupric or ferrous in the leaching vessel 105, by the concentration of $Fe^{+3}$ in the leaching vessel 105, by the concentration of $Fe^{+3}$ in the anode chamber 124A, by the ratio of $Fe^{+2}:Fe^{+3}$ in the anode chamber 124A, or by any chemical parameter. The leaching vessel 105 and the electrolytic cell 120 may be provided with heaters 161 and 162.

Figure 7:
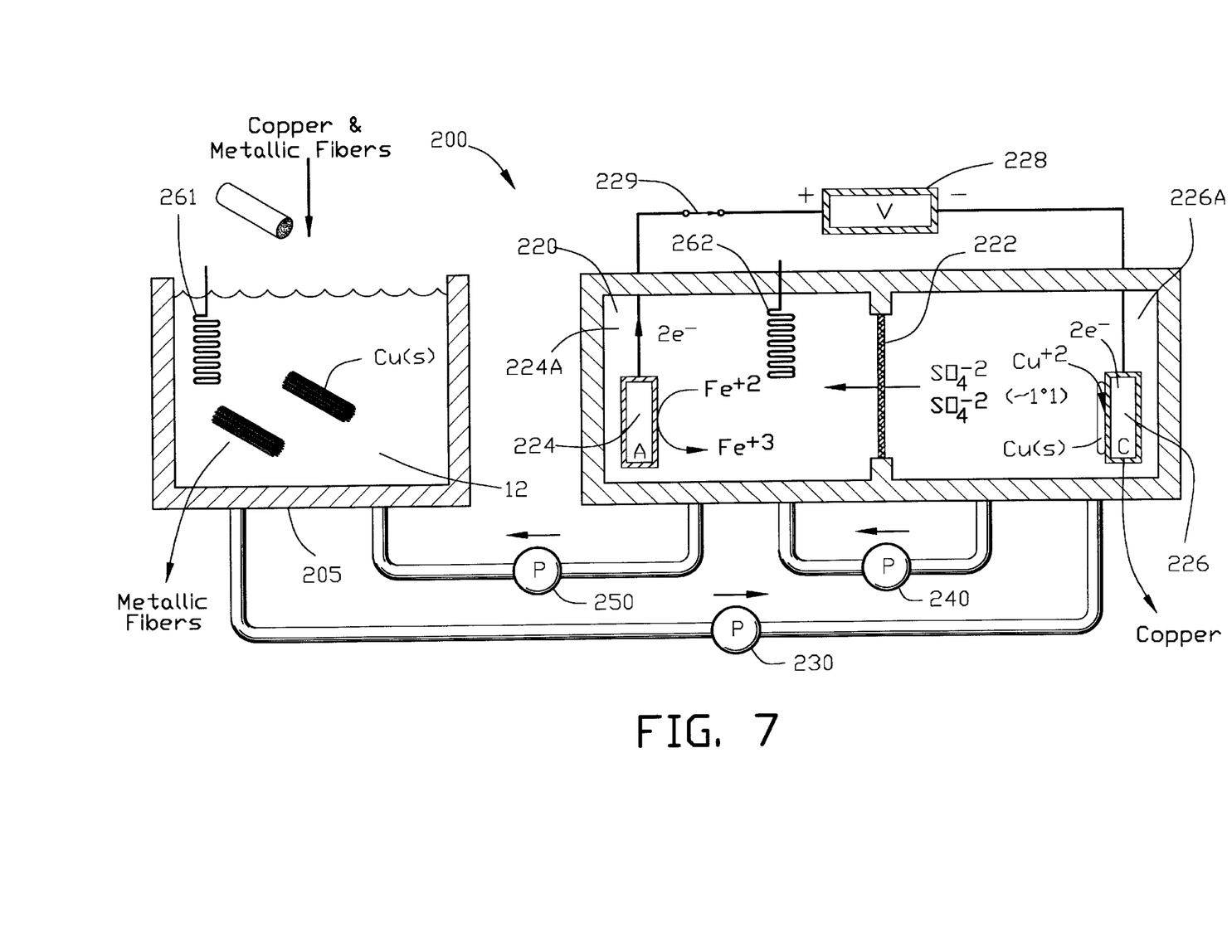
FIG. 7 illustrates a second embodiment of a continuous system operating between a leaching tank and an electrolytic cell for leaching a copper or iron coating from metallic fibers.

FIG. 7 illustrates a second embodiment of a continuous system 200 operating between a leaching tank 205 and an electrolytic cell 220 for leaching a copper coating from metallic fibers. The second embodiment of the continuous system 200 is substantially similar to the first embodiment of the continuous system 100 shown in FIG. 6.

In this example, a copper coating is affixed to metallic fibers such as stainless steel fibers 212 or the like to form a composite 214. The composite 214 is immersed in the leaching vessel 105. The leaching vessel 205 oxidizes the copper $Cu_{(s)}$ into cupric $Cu^{+2}$ to remove the copper $Cu_{(s)}$ from the stainless steel fibers 212. The leaching vessel 205 provides an output of stainless steel fibers. The electrolytic cell 220 regenerates the leach fluid 210 as heretofore described and recovers the copper removed from the stainless steel fibers 212.

The second embodiment of a continuous system 200 set forth in FIG. 7 is useful in the process for making fine metallic fibers disclosed in U.S. Pat. No. 5,890,272. The continuous system 200 of the present invention can be utilized to remove the copper from the stainless steel fibers in a simple and efficient manner.

The chemical process may be utilized to extract or leach copper or iron from any number of substrates, and is particularly advantageous to use with metallic substrates, as the underlying metal substrate will not dissolve along with the copper.

EXAMPLE 1

Figure 8:
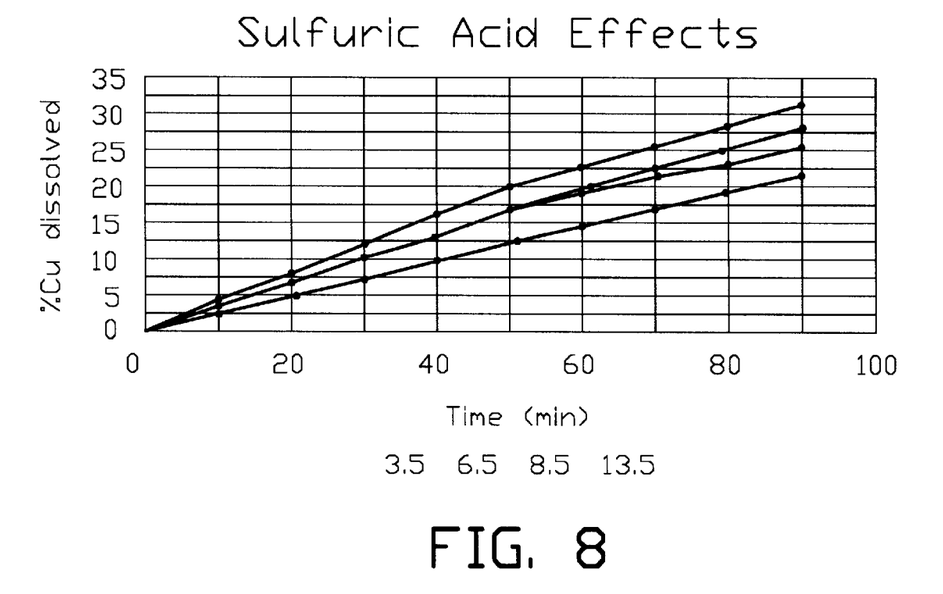
FIG. 8 is a graph of the effect of acid concentration (vol./vol.) on copper dissolution rates.

An experiment to determine the effects of sulfuric acid on the dissolution of copper by ferric sulfate was conducted. Solid copper wire samples of all the same diameter and approximate length were subjected to dissolution in solutions with the same ferric sulfate and varying sulfuric acid concentrations. The experiments were monitored by periodically removing the wire from the solution and rinsing, drying and weighing with subsequent return to the solution. Representation of the data collected can be seen in the graph in FIG. 8. From FIG. 8, it can be seen that the higher the acid concentration the less copper was dissolved. Since the acid is not a direct participant in the copper dissolution this would be expected due to the increase in acid causing the ionic strength of the solution to increase thus decreasing the activity coefficient of all species present including the ferric ions. The above experiment had a minimum acid concentration of 3.5% (vol/vol).

EXAMPLE 2

Figure 9:
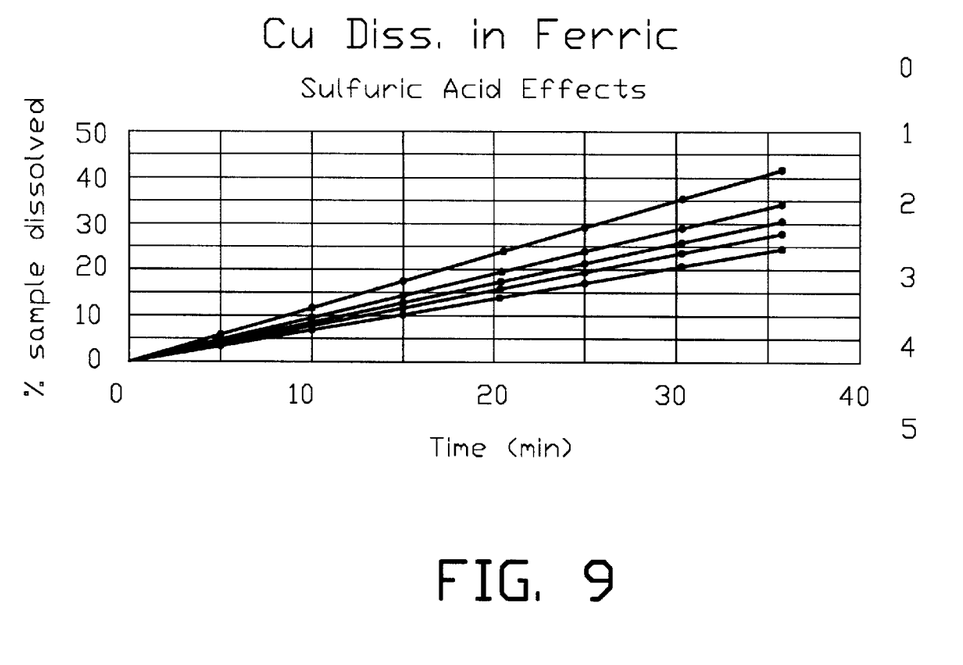
FIG. 9 is a graph of the effect of acid concentration (vol./vol.) on copper dissolution rates wherein the acid concentrations are lower than in FIG. 8.
Figure 10:
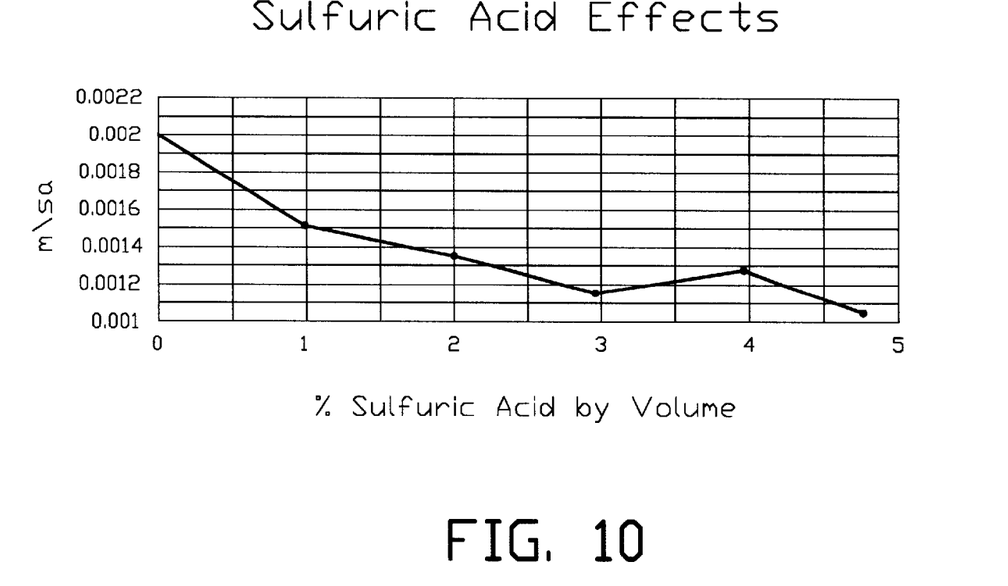
FIG. 10 is a graph of the slope of FIG. 9 versus time.

An experiment was conducted to determine the effects sulfuric acid on the dissolution of copper by ferric sulfate, wherein the sulfuric acid concentration was varied from 0 to 5%. The resulting data can be seen in the graph in FIG. 9. From FIG. 9, it can be seen that the fastest dissolution rate is obtained with no acid present. Slopes of the lines in the graph of FIG. 9 were plotted verses acid concentration to yield the graph in FIG. 10. From FIG. 10 there can be seen a marked jump from zero to one percent acid.

EXAMPLE 3

Figure 11:
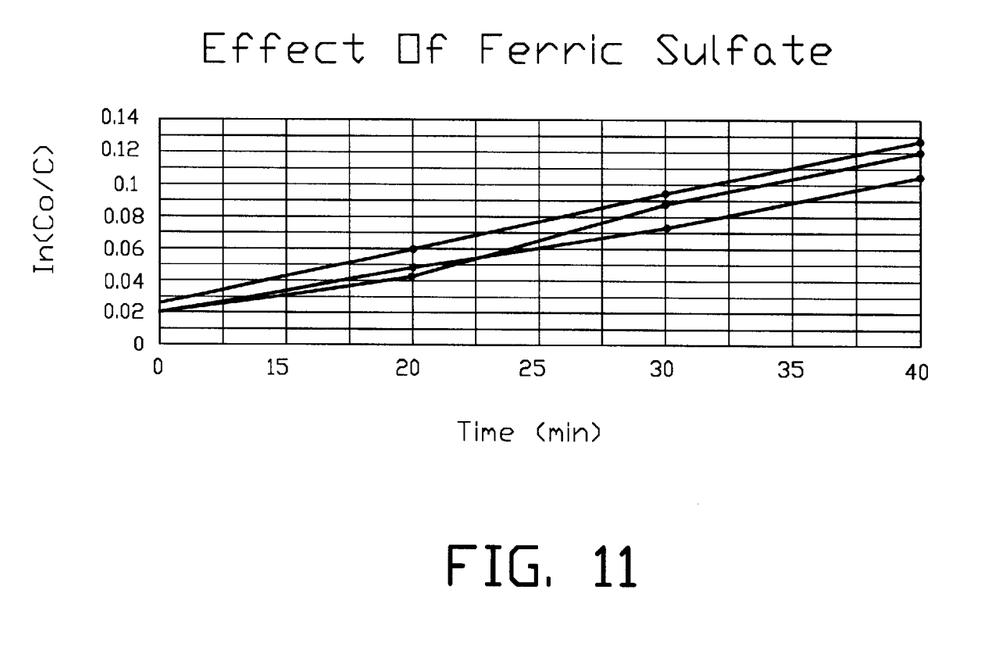
FIG. 11 is a graph showing the effect of varying ferric sulfate concentrations on the rate of copper dissolution.

An experiment was conducted to determine the effect of ferric sulfate concentration on the rate of copper dissolution. Solutions of ferric sulfate with concentrations of 32, 24, 16, and 8 g/l were made and the rate of copper dissolution in each determined by the previously described weight method. The data recorded was then processed utilizing first order Arrhenius equations with the graph in FIG. 11 representing the data. From the graph it can be seen that all four concentrations yield essentially the same line and therefore the reaction can be considered first order with respect to ferric concentration.

EXAMPLE 4

Figure 12:
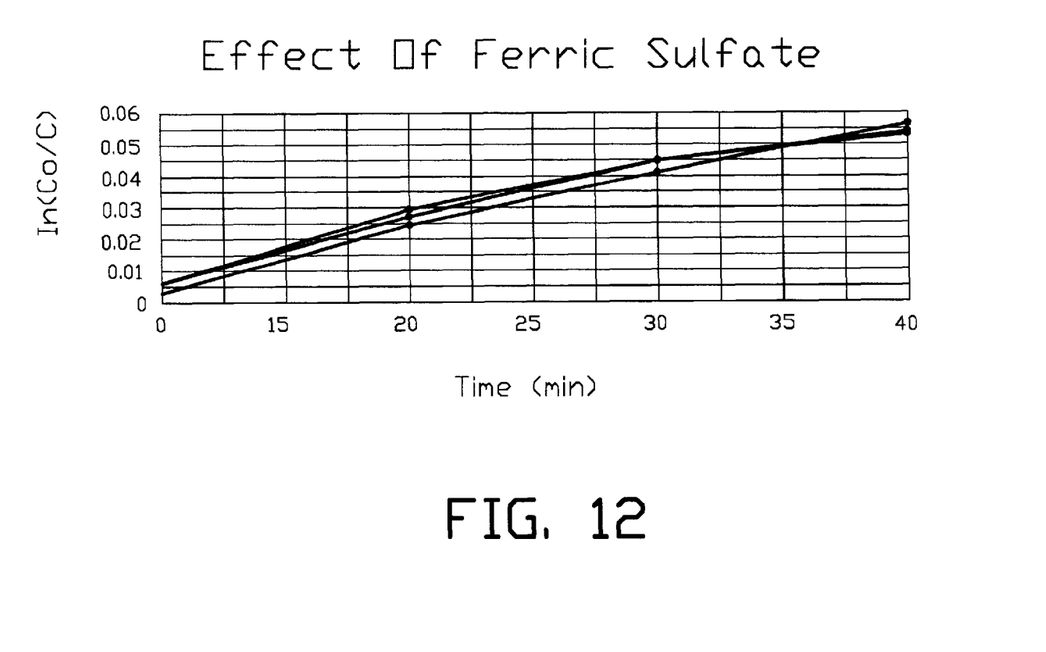
FIG. 12 is also a graph showing the effect of varying ferric sulfate concentrations on the rate of copper dissolution where the dissolution reaction is run at room temperature.

The experiment of example 3 was conducted again at room temperature with the results in the graph of FIG. 12.

EXAMPLE 5

Figure 13:
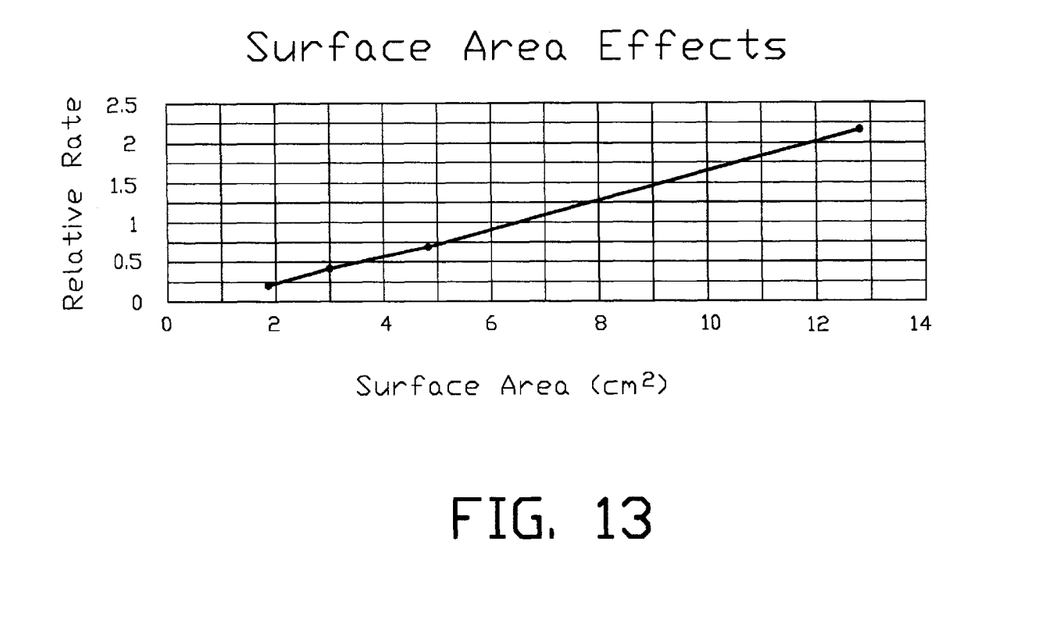
FIG. 13 is a graph showing the effect of surface area of copper on the rate of copper dissolution.

An experiment was conducted to determine the effects of the surface area of the copper on copper dissolution. Copper samples of different surface areas were created by drawing a copper wire down to varying diameters. Samples were made with diameters of 0.0813, 0.0401, 0.0284, and 0.010". These samples were then subject to dissolution in a 37 g/l ferric solution from ferric sulfate. With the results displayed in the graph of FIG. 13.

EXAMPLE 6

A small electrolytic cell system consisting of 2-1 inch diameter pieces of CPVC pipe attached with flanges while divided by an anion exchange membrane was constructed. A solution of ferrous sulfate was placed on one side of the membrane and a solution of ferrous sulfate and copper sulfate was placed on the other. A cathode of stainless steel was placed on the copper rich side of the membrane, and an anode of platinum was placed on the other side. Power was applied to the system and copper plated on the cathode. The fluid in the anode compartment turned from light green to light brown, indicating the change from ferrous to ferric. This was confirmed by analysis with visible absorption.

EXAMPLE 7

Once the above system verified that the membrane system would work, a larger system was built from 6 inch CPVC pipe. The troughs on either side of the membrane were 12 inches long and comfortably held 3.5 liters. A round anode was fabricated by punching a 5.5 inch diameter disc from a sheet of platinum plated expanded titanium. The cathode was fashioned by cutting a disk from a sheet of 316 stainless steel. A total iron concentration of 32 g Fe/l was added to both compartments of the electrolytic cell by addition of ferrous sulfate heptahydrate. In order for all of the ferrous to be converted to ferric, 18.2 g/l copper was added via copper sulfate heptahydrate. The cathode was weighed and then placed in the cell. Current was applied and varied. A current of one ampere was attained with 4 volts. Thus, the cell resistance was determined to be 4.65 ohms at room temperature. At room temperature, if the cell current was raised above 1.5 amps, the plating was in the form of sponge copper.

EXAMPLE 8

An experiment to determine the effects of voltage on cell reaction. A cell similar to the one of example 7 was constructed, with the chambers containing similar chemical concentrations. The cell was run at room temperature, with the voltage set at 7.5 volts, and copper was plated for a period of 5 minutes. The plated copper was of an undesirable spongy consistency. A series of similar cells were constructed, with similar chemical concentrations. The cells were run at room temperature, with their voltages being decreased until finally the copper plated out in the form of a solid sheet that was easily removed from the cathode. This plating occurred when the voltage was set at 4 volts.

EXAMPLE 9

Figure 14:
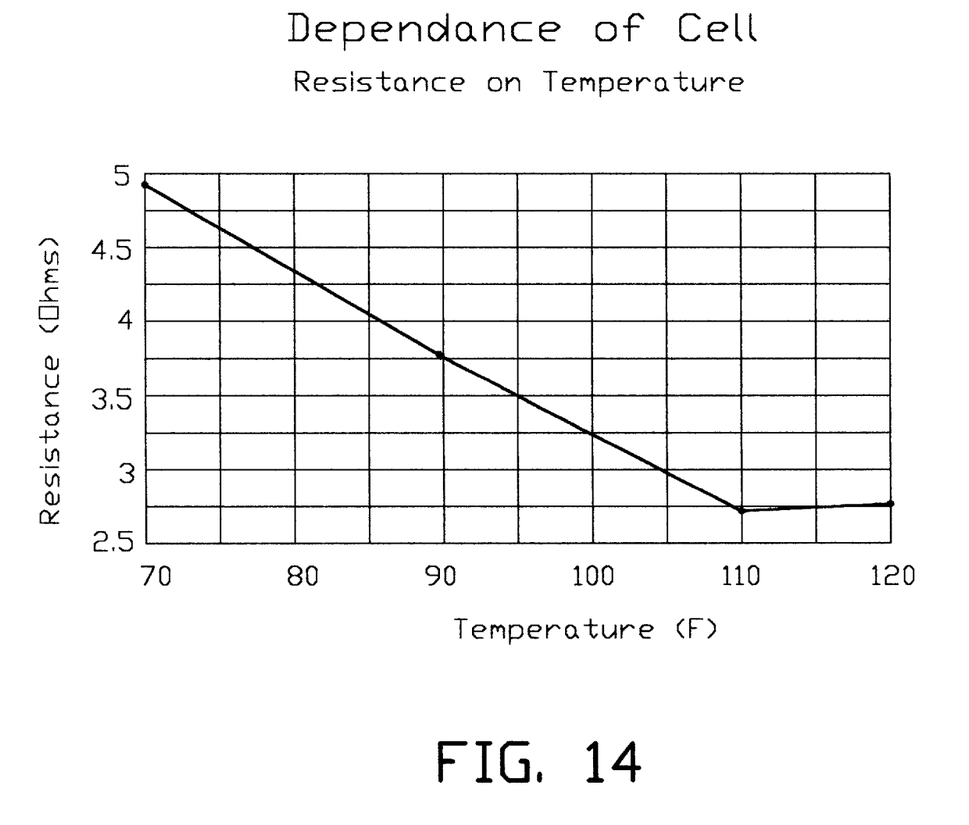
FIG. 14 is a graph showing the resistance of the cell as a function of the temperature of the solution.

An experiment to determine the effects of temperature on the cell was conducted. A cell similar to the one of example 7 was created, with similar chemical concentrations in the chambers, except two heating pads were installed on either side of the electrolytic cell membrane. Four volts were applied for a 10 minute period. The temperature of the cell was varied. The copper plating was then removed from the cathode, dried, and weighed. The data collected can be seen in FIG. 14. The temperature limitations of the membrane's integrity limited its extended use to below 120° F. The graph indicates that temperatures above 110 F. do not yield any power saving benefits.

EXAMPLE 10

An experiment to determine the effects of $Cu^{+2}$ on plated solid copper product was conducted. A cell as in Example 9 was constructed, with similar anode and cathode chamber chemical concentrations, where the temperature of the solution in the electrolytic cell was maintained at 110° F. and the voltage at 4 volts. The copper concentration on the cathode side of the cell was then varied, measured via a VARIAN SPECTRA 200 Atomic Absorption instrument. Where the copper concentration dropped below 10 g/l, the copper dropped out in the difficult-to-handle sponge form. Thus, at 110° F. and 4 volts, the copper concentration should not be lowered below 10 g/l when attempting to precipitate out solid, easy to handle copper at the anode.

EXAMPLE 11

A cell as in Example 7 was constructed. The temperature of the cell was maintained at 110° F. The cathode chamber contained a solution with 28 grams $Cu^{+2}$/liter and 32 grams $Fe^{+2}$/liter. The anode chamber contained a solution of 10 grams $Cu^{+2}$/liter and 32 grams $Fe^{+2}$/liter. The resulting copper plating was solid down to a cathode copper concentration of 10 grams/liter, at which point the power was removed and the systems analyzed. The anode side had a 99.5% oxidation in its iron and the cathode side had a 18.2 grams/liter drop in its copper concentration. The amount of copper plated out was 63.5 grams.

EXAMPLE 12

An experiment was performed to determine the number of times that the ferric sulfate could be regenerated via the electrolytic cell so as to be effective for leaching additional copper from substrate. A cell as in Example 7 was constructed. The temperature of the cell was maintained at 110° F.; a 28 grams $Cu^{+2}$/liter and 32 grams $Fe^{+2}$/liter solution was added to the cathode solution; a 10 grams $Cu^{+2}$/liter and 32 grams $Fe^{+2}$/liter solution was added to the anode solution. Voltage was applied. The resulting copper plating at the cathode was solid down to a cathode copper concentration of 10 grams/liter, at which point the power was removed. During the cupric $Cu^{+2}$ reduction to solid copper, the $Fe^{+2}$ was oxidized to $Fe^{+3}$ at the anode.

The anode solution was then heated to 130° F. and allowed to dissolve additional copper from a substrate. An excess of copper was placed in the system in order to determine the total amount of copper the system could dissolve in a one hour limit. The amount of copper dissolved was 63.4 g. In the process of dissolving additional copper, the $Fe^{+3}$ was reduced (and regenerated) to $Fe^{+2}$.

The copper containing anode solution was transferred to the cathode while the cathode solution was transferred to the anode and 3 Volts were applied until the copper concentration in the cathode dropped to 10 g/l. The temperature of the cell was maintained at 110° F.

Once again, the anode solution was then heated to 130° F. and allowed to dissolve additional copper from a substrate and simultaneously regenerate $Fe^{+2}$ from the $Fe^{+3}$ ions. The entire cycle was repeated four more times.

It was determined that towards total ferrous conversion to ferric, oxygen was generated at the anode, and subsequently, acid was produced in the fluid. It also became necessary to plate out more copper than would normally be necessary stoichiometrically, in order to completely oxidize the anode solution from ferrous to ferric. This can be explained by diffusion limitations.

EXAMPLE 13

A cell as in Example 11 was constructed, with similar chamber solutions, except that the cell was constructed so as to avoid diffusion limitations experienced in Example 9. The cell was constructed with a larger membrane surface area per fluid volume, and so that there was a high fluid velocity over the electrodes.

The present disclosure includes that contained in the appended claims as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A chemical process for extracting copper or iron from a metallic substrate comprising:
   a. exposing the copper or iron (M) containing substrate to a leaching solution comprising a metal salt (m) wherein the substrate is insolvable in the metal salt solution, such that the copper or iron is solvated from the substrate and the metal ion is reduced according to the reaction $$2m^{+3}_{(aq)} + M_{(s)} \rightarrow 2m^{+2}_{(aq)} + M^{+2}_{(aq)};$$

b. providing an electrolytic cell with an anion exchange membrane that separates the anode from the cathode, thereby creating an anode chamber and a cathode chamber;
   c. transferring the leaching solution with the solvated copper or iron into the cathode chamber of the electrolytic cell;
   d. adding a second solution to the anode chamber, wherein the second solution comprises a reduced state metal salt $m^{+2}$ of the salt in the leaching solution;
   e. applying a voltage to the cell wherein the copper or iron is reduced and is removed from the metallic substrate leaving the metallic substrate substantially unaltered and is deposited at the cathode and the reduced metal $m^{+2}$ is oxidized at the at the anode;
   f. recycling the oxidized metal $m^{+3}$ in the anode chamber to step (a) in order to solvate further amounts of copper or iron; and
   g. transferring the cathode chamber reduced-metal-containing solution to the anode chamber as the second solution of step (d).

2. The chemical process for extracting copper or iron from a metallic substrate as set forth in claim 1, wherein the polarity of the electrolytic cell is inverted after deposition of copper or iron (M) at the cathode, reduction of $M^{+2}$ to $M_{(s)}$ at the cathode, and recycling of the oxidized metal $m^{+3}$ in the anode chamber to step (a) such that the reduced-metal containing solution need not be transferred to function as the second solution of step (d).

3. The chemical process for extracting copper or iron from a metallic substrate as set forth in claim 1, wherein the substrate is selected from a group consisting of stainless steal, platinum, polyethylene, or any number of iron-based super alloys.

4. The chemical process for extracting copper or iron from a metallic substrate as set forth in claim 1, wherein the substrate is an iron-based super alloy.

5. The chemical process for extracting copper or iron from a metallic substrate as set forth in claim 1, wherein the salts in the leaching and second solutions are iron salts.

6. The chemical process for extracting copper or iron from a metallic substrate as set forth in claim 1, wherein the salts in the leaching and second solutions are iron sulfates, and wherein the salt in the leaching solution is ferric sulfate, and wherein the salt in the second solution is ferrous sulfate.

7. The chemical process for extracting copper or iron from a metallic substrate as set forth in claim 1, wherein the pH of the leaching solution is maintained at or below 2.8.

8. The chemical process for extracting copper or iron from a metallic substrate as set forth in claim 1, wherein the copper or iron is solvated from the substrate at a temperature of 76 to 200 degrees Fahrenheit.

9. The chemical process for extracting copper or iron from a metallic substrate as set forth in claim 1, wherein additional oxidized state metal salt is added to the oxidized metal $m^{+3}$ anode chamber solution of step (f) prior to its recycling.

10. A chemical process for extracting copper from a stainless steel substrate comprising:
    a. exposing the copper-containing, stainless steel substrate to a leaching solution comprising a metal salt wherein the stainless steel substrate is insolvable in the leaching solution, such that the copper is solvated and the metal ion is reduced according to the following reaction $$2m^{+3}_{(aq)} + Cu_{(s)} \rightarrow 2m^{+2}_{(aq)} + Cu^{+2}_{(aq)};$$

b. providing an electrolytic cell with an anion exchange membrane that separates the anode from the cathode, thereby creating an anode chamber and a cathode chamber;
    c. transferring the leaching solution with the solvated copper into the cathode chamber of the electrolytic cell;
    d. adding a second solution to the anode chamber, wherein the second solution comprises a reduced state metal salt $m^{+2}$ of the salt in the leaching solution;
    e. applying a voltage to the cell wherein the copper is reduced and is removed from the stainless steel substrate leaving the stainless steel substrate substantially unaltered and is deposited at the cathode and the reduced metal $m^{+2}$ is oxidized at the at the anode;
    f. recycling the oxidized metal $m^{+3}$ in the anode chamber to step (a) in order to solvate further amounts of copper; and
    g. transferring the cathode chamber reduced-metal-containing solution to the anode chamber of step (d).

11. The chemical process for extracting copper from a metallic substrate as set forth in claim 10, wherein the polarity of the electrolytic cell is inverted after deposition of copper at the cathode, reduction of $Cu^{+2}$ to $Cu_s$ at the cathode, and recycling of the oxidized metal $m^{+3}$ in the anode chamber to step (a) such that the reduced-metal containing solution need not be transferred to function as the second solution of step (d).

12. The chemical process for extracting copper from a stainless steel substrate as set forth in claim 10, wherein the salts in the leaching and second solutions are iron salts.

13. The chemical process for extracting copper from a stainless steel substrate as set forth in claim 10, wherein the salts in the leaching and second solutions are iron sulfates, and wherein the salt in the leaching solution is ferric sulfate, and wherein the salt in the second solution is ferrous sulfate.

14. The chemical process for extracting copper from a stainless steel substrate as set forth in claim 10, wherein the pH of the leaching solution is maintained below 2.8.

15. The chemical process for extracting copper from a stainless steel substrate as set forth in claim 10, wherein the copper is solvated from the stainless steel substrate at a temperature of 76 to 200 degrees Fahrenheit.

16. The chemical process for extracting copper from a stainless steel substrate as set forth in claim 10, wherein additional oxidized metal salt is added to the oxidized metal $m^{+3}$ anode chamber solution of step (f) prior to its recycling.

17. The chemical process for extracting copper from a stainless steel substrate as set forth in claim 10, wherein the cupric concentration in the cathode chamber is maintained above 10 g/l.

18. A chemical process for extracting iron, comprising:

a. exposing the iron (M) to a leaching solution comprising a metal salt (m), such that the iron (M) is solvated and the metal ion is reduced according to the reaction $$2m^{+3}{}_{(aq)} + M_{(s)} \rightarrow m^{+2}{}_{(aq)} + M^{+2}{}_{(aq)};$$

b. providing an electrolytic cell with an anion exchange membrane that separates the anode from the cathode, thereby creating an anode chamber and a cathode chamber;

c. transferring the leaching solution with the solvated iron into the cathode chamber of the electrolytic cell;

d. adding a second solution to the anode chamber, wherein the second solution comprises a reduced state metal salt m+2 of the salt in the leaching solution;

e. applying a voltage to the cell wherein the iron is reduced and deposited at the cathode and the reduced metal m+2 is oxidized at the at the anode;

f. recycling the oxidized metal $m^{+3}$ in the anode chamber to step (a) in order to solvate further amounts of iron; and g. transferring the cathode chamber reduced metal-containing solution to the anode chamber of step (d).

19. The chemical process for extracting iron as set forth in claim 18, wherein the salts in the leaching and second solution are iron salts.

20. The chemical process for extracting iron as set forth in claim 18, wherein the salts in the leaching and second solutions are iron sulfates, wherein the salt in the leaching solution is ferric sulfate, and wherein the salt in the second solution is ferrous sulfate.

21. The chemical process for extracting iron as set forth in claim 18, wherein the leaching solution containing the solvated iron from step (a) is filtered prior to its transfer to the cathode chamber.

22. The chemical process for extracting iron as set forth in claim 18, wherein the iron is disposed on a substrate; and the substrate is stainless steel.

23. The chemical process for extracting iron as set forth in claim 18, wherein the iron is disposed on a substrate; and the substrate is polyethylene.

24. The chemical process for extracting iron as set forth in claim 18, wherein the pH of the leaching solution of step (a) is maintained at or below 2.8.

25. The chemical process for extracting iron as set forth in claim 18, wherein the iron is solvated at a temperature in the range of 76 to 200 degrees Fahrenheit.

26. The chemical process for extracting iron as set forth in claim 18, wherein additional oxidized state metal salt is added to the solution of oxidized metal $m^{+3}$ in the anode chamber at step (f) prior to its recycling.

* * * * *